(No Model.)

E. C. BARTON.
BICYCLE BELL.

No. 513,606.

Patented Jan. 30, 1894.

Witnesses:
Joseph Arth. Cantin.
Arthur B. Jenkins.

Inventor.
Elijah C. Barton
by Chas. L. Burdett,
Attorney.

THE NATIONAL LITHOGRAPHING COMPANY,
WASHINGTON, D. C.

UNITED STATES PATENT OFFICE.

ELIJAH C. BARTON, OF EAST HAMPTON, CONNECTICUT, ASSIGNOR TO GONG BELL MANUFACTURING CO., OF SAME PLACE.

BICYCLE-BELL.

SPECIFICATION forming part of Letters Patent No. 513,606, dated January 30, 1894.

Application filed March 23, 1893. Serial No. 467,234. (No model.)

*To all whom it may concern:*

Be it known that I, ELIJAH C. BARTON, of East Hampton, in the county of Middlesex and State of Connecticut, have invented certain new and useful Improvements in Bicycle-Bells, of which the following is a full, clear, and exact description, whereby any one skilled in the art can make and use the same.

My invention relates to the class of bells that are adapted to be secured to the handle bar of a bicycle or like vehicle in convenient position so that the rider of the vehicle may promptly sound an alarm, and the object of my invention is to provide a bell of this class that is comparatively simple in construction and with operative parts that will give a blow of changeable intensity and with the handle in position where it is least likely to be injured in the use of the wheel.

To this end my invention consists in the details of the several parts making up the bell as a whole and in the combination of such parts as more particularly hereinafter described and pointed out in the claims.

Figure 1:
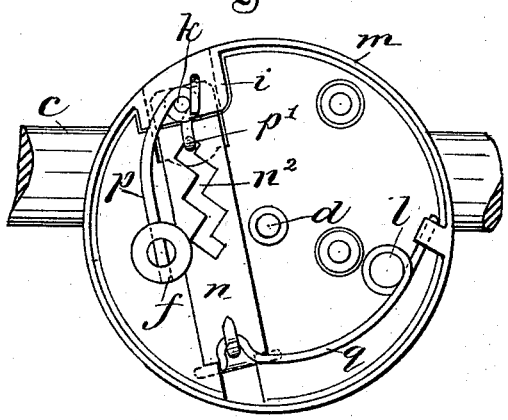
Figure 2:
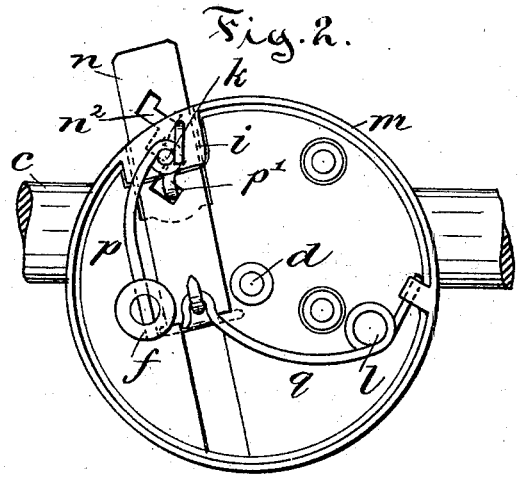
Figure 3:
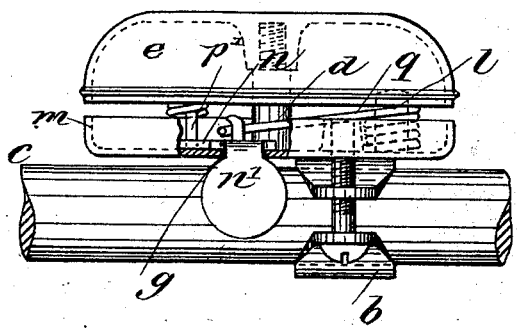
Figure 4:
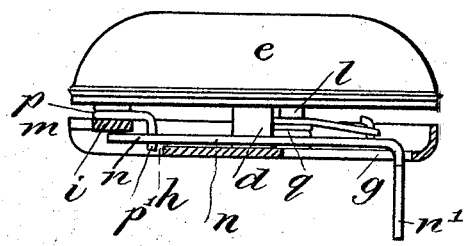

Referring to the drawings: Figure 1 is a plan view of the base of a bicycle bell with the gong removed to show the bell striking mechanism. Fig. 2 is a plan view of the base piece with the slide at the outer limit of its play. Fig. 3 is an edge view of the bell with part cut away to show construction. Fig. 4 is an edge view of the gong and in lengthwise section through the base piece on a plane at right angles to the plane of view of Fig. 3, the plane of section passing along the slide.

In the accompanying drawings the letter $m$ denotes the base of a bell provided with a clamp device $b$ by means of which it may be secured in position on the handle bar $c$ of a bicycle or like vehicle. On the base $m$ there is a central post $d$ to which the gong $e$ is secured as by means of the threaded stem fitting into the threaded socket in a hub on the gong. A slide plate $n$ is supported on the base with a handle $n'$ turned at substantially right angles to the base piece and located on its under side. The handle extends through a slot $g$ in the base piece and is greater in breadth than the slot is in width, as shown in Fig. 3 of the drawings. The end of the slide opposite to the handle projects through an opening $h$ in the base piece, and when the slide is at the inner limit of its play the end underlies the upper wall $i$ of the opening. This arrangement of the slide serves as a means of connection to the base piece.

When the bell as a whole is fast to the handle of a bicycle the handle $n'$ is located in a convenient position to be reached by the thumb of the operator while the fingers of the hand are grasping the handle bar, and the location of this handle on the back or under side of the bell places it out of the way of ordinary accidents and also where it is not liable to catch in any garment.

The slide plate $n$ is provided with a zig-zag slot $n^2$ which is adapted to receive the end $p'$ of the hammer lever $p$, the outer end of which supports a hammer $f$. This hammer lever $p$ is supported on a stud $k$ secured to a fixed part of the base piece $m$, the lever being pivoted on the stud so as to enable it to receive a swinging movement. This swinging movement of the hammer lever is imparted by the sliding movement of the plate $n$, the lever being swung back and forth as the several different faces of the irregular slot in the slide are pushed against the end $p'$ of the lever which projects into the slot as the plate $n$ is moved. The force of the blow of the swinging hammer against the gong is in proportion with the force and speed with which the slide is moved. A spring $q$ is fast at one end to a fixed post $l$ on the base piece and its outer end engages with the slide $n$ in such manner as to hold the latter normally at the inner limit of its play. The location of the handle of the slide at the back of the base forms one important feature of my improvement, and the position and combination of the parts described, which are few in number and simple in construction, provides a bell having the peculiar kind of an intermittent or rattling stroke which is particularly desired in this class of bells and is obtained in others of the class by a greater number of parts and usually a complicated system of gears.

I claim as my invention—

In combination, in an alarm bell, the base piece $m$, with the clamp $b$ for detachably securing the base piece and bell to the handle bar of a bicycle or like vehicle, the gong $e$ removably secured to the base piece, a hammer lever $p$ supporting a hammer $f$ and pivoted within the bell with its end $p'$ projecting into the zigzag slot $m^2$, in the slide plate $n$, the hammer operating slide plate $n$ having one end underlying the upper wall $i$ of the opening $h$ in the base piece, the handle $n'$ on the slide projecting through the opening $h$ in the base piece and located on the under side thereof whereby a cover or shield for the handle is provided, the neck of the handle being located in the opening $h$, and the slide spring $q$, all substantially as described.

ELIJAH C. BARTON.

Witnesses:
E. G. CONE,
A. H. CONKLIN.